(12) United States Patent
Liu

(10) Patent No.: US 11,974,154 B2
(45) Date of Patent: Apr. 30, 2024

(54) METHOD AND DEVICE FOR TRANSMITTING CONFIGURATION INFORMATION RELATED TO MEASUREMENT CONTROL

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 389 days.

(21) Appl. No.: 17/417,006

(22) PCT Filed: Dec. 24, 2018

(86) PCT No.: PCT/CN2018/123213
§ 371 (c)(1),
(2) Date: Jun. 21, 2021

(87) PCT Pub. No.: WO2020/132832
PCT Pub. Date: Jul. 2, 2020

(65) Prior Publication Data
US 2022/0078652 A1    Mar. 10, 2022

(51) Int. Cl.
*H04W 24/10* (2009.01)
*H04W 24/08* (2009.01)
*H04W 36/32* (2009.01)

(52) U.S. Cl.
CPC .......... *H04W 24/10* (2013.01); *H04W 24/08* (2013.01); *H04W 36/32* (2013.01)

(58) Field of Classification Search
CPC ..... H04W 24/10; H04W 24/08; H04W 36/32; H04W 36/0061; H04W 36/00835;
(Continued)

(56) References Cited

U.S. PATENT DOCUMENTS

2002/0180870 A1   12/2002   Chen
2009/0161911 A1    6/2009   Shih et al.
(Continued)

FOREIGN PATENT DOCUMENTS

CN     101453770 A     6/2009
CN     101867989 A    10/2010
(Continued)

OTHER PUBLICATIONS

International Search Report of PCT/CN2018/123213 dated Sep. 27, 2019 with English translation, (4p).
(Continued)

*Primary Examiner* — Jung H Park
(74) *Attorney, Agent, or Firm* — Arch & Lake LLP

(57) ABSTRACT

A method and a device for transmitting configuration information related to measurement control. The base station generates configuration information for measurement control, the configuration information including a first set of configuration information, a second set of configuration information and a determination condition. The first set of configuration information is related to a first measurement target, the first measurement target is related to a known moving trajectory, and the second set of configuration information is related to a second measurement target, the second measurement target is related to an unknown moving trajectory. The base station sends the configuration information to a user device to instruct the user device to adopt the first set of configuration information for cell measurement when the determination condition is met and to adopt the second set of configuration information for cell measurement when the determination condition is not met.

13 Claims, 6 Drawing Sheets

(58) Field of Classification Search
CPC . H04W 4/025; H04W 4/029; H04W 36/0085; Y02D 30/70; G01S 5/00
See application file for complete search history.

(56) References Cited

U.S. PATENT DOCUMENTS

| | | | | |
|---|---|---|---|---|
| 2014/0335865 | A1* | 11/2014 | Zhang | H04W 36/0061 |
| | | | | 455/436 |
| 2016/0081021 | A1 | 3/2016 | Abdel-Samad et al. | |
| 2016/0242052 | A1 | 8/2016 | Kazmi et al. | |
| 2017/0142618 | A1* | 5/2017 | Hahn | H04W 36/18 |
| 2020/0229206 | A1* | 7/2020 | Badic | H04W 52/0209 |
| 2020/0236605 | A1* | 7/2020 | Yiu | H04W 36/32 |
| 2020/0374719 | A1* | 11/2020 | Wang | H04W 24/04 |

FOREIGN PATENT DOCUMENTS

| | | |
|---|---|---|
| CN | 105794255 A | 7/2016 |
| EP | 2950584 A1 | 12/2015 |
| IN | 201637004622 A1 | 7/2016 |
| JP | 2007336421 A1 | 12/2007 |
| KR | 101867831 B1 | 6/2018 |
| WO | 2015015886 A1 | 2/2015 |

OTHER PUBLICATIONS

KROA of Application No. 10-2021-7020932 dated on Feb. 19, 2023 with English translation,(13p) .
Extended European Search Report issued in Application No. 18944400.3, dated Jul. 6, 2022,(9p).
NOA of Application No. 202147030324 dated on May 12, 2022 with English translation,(6p).
JPOA of Application No. 2021-535948 dated on Jul. 15, 2022 with English translation,(12p).
Office Action in Application No. 202147030324 from Indian Patent Office, issued on Jan. 2, 2024.(2P).

* cited by examiner

METHOD AND DEVICE FOR TRANSMITTING CONFIGURATION INFORMATION RELATED TO MEASUREMENT CONTROL

CROSS-REFERENCE TO RELATED APPLICATION

This application is the US national phase application of International Application No. PCT/CN2018/123213, filed on Dec. 24, 2018, the entire contents of which are incorporated herein by reference.

TECHNICAL FIELD

The present disclosure relates to the field of communication technology, and particularly to a method and a device for transmitting configuration information related to measurement control.

BACKGROUND

The goal of 5G system (the fifth generation mobile communication system) is to support call communication under high speed moving and MB communication under low speed moving. The user device (UE) looks for a cell with good signal quality to access. The premise of cell reselection and cell handover is to perform cell measurement on the neighboring cell and report the measurement result to the base station. The user device usually performs cell measurement on the cell where it is located and neighboring cells, which consume the power of the user device.

SUMMARY

According to a first aspect of the present disclosure, a method for transmitting configuration information related to measurement control is provided. The method is applied to a base station side, and includes:
  generating configuration information for measurement control, the configuration information including a first set of configuration information, a second set of configuration information and one or more determination condition, the first set of configuration information being related to a first measurement target, the first measurement target being related to a known moving trajectory, the second set of configuration information being related to a second measurement target, the second measurement target being related to an unknown moving trajectory; and
  sending the configuration information to a user device, to instruct the user device to adopt the first set of configuration information for cell measurement when the one or more determination conditions are met and to adopt the second set of configuration information for cell measurement when the one or more determination conditions are not met.

According to a second aspect of the present disclosure, a method for transmitting configuration information related to measurement control. The method is applied to a user device side, and includes:
  receiving measurement configuration information sent by a base station, the configuration information including a first set of configuration information, a second set of configuration information and one or more determination conditions, the first set of configuration information being related to a first measurement target, the first measurement target being related to a known moving trajectory, the second set of configuration information being related to a second measurement target, the second measurement target being related to an unknown moving trajectory;
  performing cell measurement by adopting the first set of configuration information when the one or more determination conditions are met; and
  performing cell measurement by adopting the second set of configuration information when the one or more determination conditions are not met.

According to a third aspect of the present disclosure, a device for transmitting configuration information related to measurement control is provided. The device includes:
  a processor; and
  a memory, configured to store instructions executable by the processor,
  wherein the processor is configured to:
  generate configuration information for measurement control, the configuration information including a first set of configuration information, a second set of configuration information and one or more determination conditions, the first set of configuration information being related to a first measurement target, the first measurement target being related to a known moving trajectory, the second set of configuration information being related to a second measurement target, the second measurement target being related to an unknown moving trajectory; and
  send the configuration information to a user device, to instruct the user device to adopt the first set of configuration information for cell measurement when the one or more determination conditions are met and to adopt the second set of configuration information for cell measurement when the one or more determination conditions are not met.

According to a fourth aspect of embodiments of the present disclosure, a device for transmitting configuration information related to measurement control is provided. The device includes:
  a processor; and
  a memory, configured to store instructions executable by the processor,
  wherein the processor is configured to:
  receive measurement configuration information sent by a base station, the configuration information comprising a first set of configuration information, a second set of configuration information and one or more determination conditions, the first set of configuration information being related to a first measurement target, the first measurement target being related to a known moving trajectory, the second set of configuration information being related to a second measurement target, the second measurement target being related to an unknown moving trajectory;
  perform cell measurement by adopting the first set of configuration information when the one or more determination conditions are met; and
  perform cell measurement by adopting the second set of configuration information when the one or more determination conditions are not met.

According to a fifth aspect of embodiments of the present disclosure, a computer readable storage medium having computer programs stored on is provided. The computer programs are configured to implement the method at the base station side when being executed by a processor.

According to a sixth aspect of embodiments of the present disclosure, a computer readable storage medium having computer programs stored on is provided. The computer programs are configured to implement the method at the user device side when being executed by a processor.

It should be understood that both the above general description and the following detailed description are exemplary and explanatory only and are not restrictive of the disclosure.

BRIEF DESCRIPTION OF THE DRAWINGS

The drawings herein are incorporated into the specification and constitute a part of the specification, show embodiments in conformity with the present disclosure, and explain the principle of the present disclosure together with the specification.

DETAILED DESCRIPTION

Reference will now be made in detail to embodiments, examples of which are illustrated in the accompanying drawings. When the following description refers to the accompanying drawings, the same numbers in different drawings represent the same or similar elements, unless otherwise represented. The implementations described in the following embodiments do not represent all implementations consistent with the present disclosure. On the contrary, they are only examples of devices and methods consistent with some aspects of the present disclosure.

The goal of 5G system (the fifth generation mobile communication system) is to support call communication under high speed moving and MB communication under low speed moving. The user device (UE) looks for a cell with good signal quality to access. The premise of cell reselection and cell handover is to perform cell measurement on the neighboring cell and report the measurement result to the base station. The user device usually performs cell measurement on the cell where it is located and neighboring cells, which consume the power of the user device.

Inventors of the present disclosure finds that, given a known moving trajectory, the associated measurement control configuration information may be configured with respect to the known trajectory, to reduce the measurement load on the user device, thereby saving power with little impact on the measurement effect.

Figure 1:
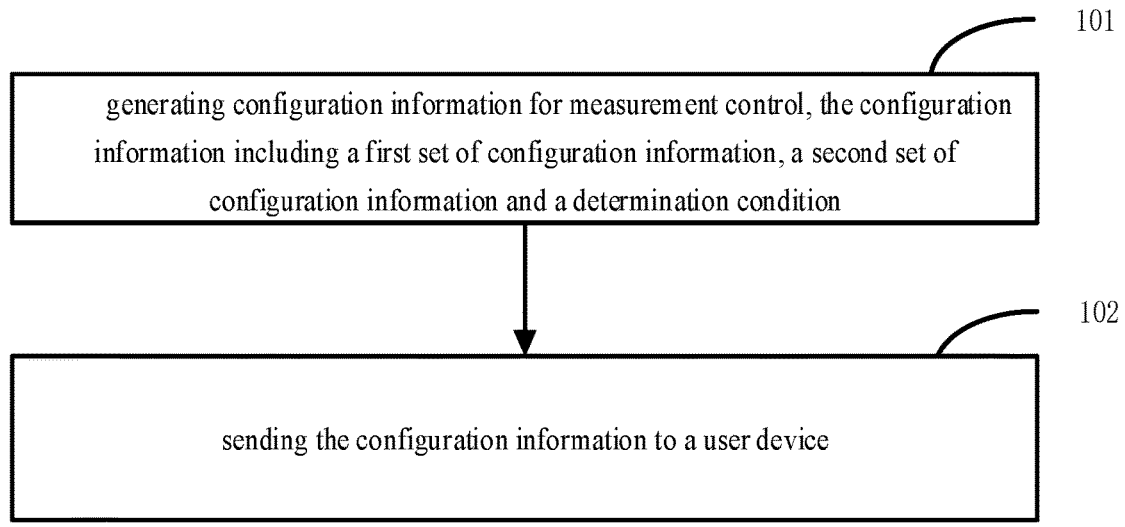
FIG. 1 is a flow chart illustrating a method for transmitting configuration information related to measurement control according to an embodiment.

FIG. 1 is a flow chart illustrating a method for transmitting configuration information related to measurement control according to an embodiment. This method is applied to an access network device such as a base station. As illustrated in FIG. 1, the method includes following steps 101-102.

At step 101, configuration information for measurement control is generated, the configuration information including a first set of configuration information, a second set of configuration information and one or more determination conditions. The first set of configuration information is related to a first measurement target, and the first measurement target is related to a known moving trajectory. The second set of configuration information is related to a second measurement target, and the second measurement target is related to an unknown moving trajectory.

At step 102, the configuration information is sent to a user device, to instruct the user device to adopt the first set of configuration information for cell measurement when the one or more determination conditions are met and to adopt the second set of configuration information for cell measurement when the one or more determination conditions are not met.

In this embodiment, base stations are pre-arranged along a fixed trajectory (i.e., the known moving trajectory), and these base stations are mainly used to provide services to user devices on the fixed trajectory. For example, the fixed trajectory may be a highway or railway line. Although these base stations may be configured without map information to reflect the known moving trajectory, the positions of these base stations in the objective natural environment may reflect that the supported first measurement target is the measurement target of the known moving trajectory. The moving direction of the user device on the fixed trajectory is predictable, as is the cell it may access. Therefore, in this embodiment, in view of the application scenario of a known moving trajectory, the configuration information related to the first measurement target, namely the first set of configuration information, is configured. The base station along the known moving trajectory needs to send the first set of configuration information for the user devices it serves.

For the base station far away from the known moving trajectory, the user device it serves may move in various directions, the moving direction is unpredictable, the possible access to the cell is also unpredictable, so the second measurement target supported by the base station far away from the known moving trajectory is the measurement target related to the unknown moving trajectory. Base stations far away from the known moving trajectory may not send the first set of configuration information, but may send the second set of configuration information.

From the perspective of predictability, the range of the first measurement target is less than that of the second measurement target, so the power consumption of the user device adopting the first set of configuration information for cell measurement may be lower than the power consumption of the user device adopting the second set of configuration information for cell measurement.

Meanwhile, the base station sends the determination condition to the user device and instruct the user device to adopt the corresponding configuration information according to the determination condition. The determination condition is sent by the base station, which facilitates the flexible configuration of the determination condition.

In this embodiment, the configuration information for measurement control is configured specifically for the known moving trajectory, the content of the configuration information is improved, and the measurement load of the user device is reduced without affecting the measurement effect basically, thus saving the power consumption of the user device.

In this embodiment, configuration information for measurement control may be sent to the user device through system information broadcasting and sending measurement control messages, so that the user devices in various states may receive the configuration information.

Regardless of whether it is sent in a system message (such as a system information block, SIB) or a measurement control message, the first set of configuration information, the second set of configuration information, and the determination condition may have a specific location or order in the message. The user device may know whether it receives the first set of configuration information or the second set of configuration information or the determination condition according to the specific location or order.

In an embodiment, the first set of configuration information includes at least one of first measurement frequency points and a first measurement cycle;
    the second set of configuration information includes at least one of second measurement frequency points and a second measurement cycle,
    in which the first measurement cycle is greater than or equal to the second measurement cycle, the first measurement frequency points include frequency points in a neighboring cell covering the known moving trajectory, and a number of the first frequency points is less than a number of the second frequency points.

In this embodiment, the first set of configuration information is suitable for neighboring cells covering the known moving trajectory, that is, a part of neighboring cells in a particular direction. The second set of configuration information is suitable for most neighboring cells in all directions. Thus, the number of the first measurement frequency points is less than the number of the second measurement frequency points. Since the number of the first measurement frequency points is smaller, and the shape of the neighboring cell covering the known moving trajectory is usually elongated, the cell measurement may not be carried out frequently, and thus the first measurement cycle may be greater than the second measurement cycle. Both reducing the number of measurement frequency points and prolonging the measurement cycle can save the power of the user device.

In an embodiment, the one or more determination conditions include:
    a number of times of cell reselection and receiving the first set of configuration information within a first preset period being greater than a first threshold number of times.

This embodiment provides a condition for determining the movement trajectory. Each time the user device performs cell reselection and receives the first set of configuration information in the reselected cell, the cumulative number of times is increased by 1. Since the base station sends the first set of configuration information to the user devices along the known moving trajectory, the user device receiving the first set of configuration information can determine that it is located along the known moving trajectory. The cell reselection of the user device may confirm that the user device is moving. Combined with the above two conditions, it can be determined that the user device is moving on the known moving trajectory. If the number of cell reselection and receiving the first group of configuration information within the first preset period is greater than the first threshold number of times, it can be determined that the user device is moving quickly on the known moving trajectory, which is applicable to the first group of configuration information. Other determination conditions for the moving trajectory also apply to this embodiment. The first period may be a hundred milliseconds or a few seconds. The first threshold number of times may be 3-5.

In an embodiment, the one or more determination conditions further include at least one of:
    a detected moving speed being greater than a preset moving speed threshold; and
    a number of times of cell change within a second preset period being greater than a number threshold number of times.

This embodiment provides the determination conditions on the moving speed, making the first set of configuration information applicable to a user device that is moving rapidly on the known moving trajectory, for example, applicable to the user device in the car running on the highway, and the user device on the high-speed train, etc. Other determination conditions on the moving speed also apply to this embodiment. The second period may be a hundred milliseconds or a few seconds, etc. The second threshold number of times may be 3-5.

In this embodiment, the content information of the determination condition may be carried directly in the system message or in the measurement control message. Alternatively, each determination condition is sent to the user device in advance, and the serial number or identifier is configured for each determination condition. When the first set of configuration information is carried in the message and the determination condition is to be applied, the serial number or identifier of the determination condition may be carried in the message. The user device may determine by the serial number or identifier that the determination condition is to be applied, and it may know which determination condition to apply.

In an embodiment, the first set of configuration information further includes a first subset of configuration information related to an upward moving direction in the known moving trajectory; and/or a second subset of configuration information related to a downward moving direction in the known moving trajectory.

This embodiment further subdivides the moving direction on the basis of the moving trajectory, for example, from Beijing to Shanghai is the upward moving direction, and from Shanghai to Beijing is the downward moving direction. After the moving trajectory and direction are determined, the expected range of neighboring cells may be further reduced, and thus the measurement frequency points may be further reduced and the measurement cycle may be prolonged.

Figure 2:
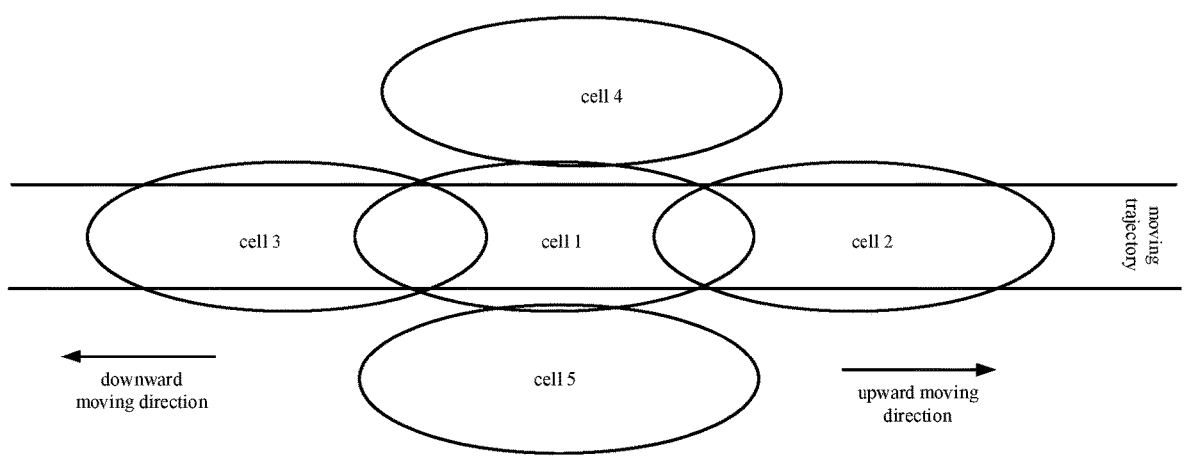
FIG. 2 is a schematic diagram illustrating cells according to an embodiment.

For example, as shown in FIG. 2, the currently camped cell is cell 1, the neighboring cell in the upward moving direction of the moving trajectory is cell 2, the neighboring cell in the downward moving direction is cell 3, and the neighboring cells in the other directions include cell 4 and cell 5. The second set of configuration information is applicable to neighboring cells in all directions, and thus the measurement frequency points in the second set of configuration information include frequency points from cells 2-5. Without distinguishing the moving direction, the measurement frequency points in the first set of configuration information include the frequency points of cells 2-3. The measurement frequency points in the first subset of configuration information include the frequency points of cell 2. The measurement frequency points in the second subset of configuration information include the frequency points of cell 3.

The implementation process on the base station side is introduced above. The corresponding user device side is also improved. The implementation process on the user device side is described below.

Figure 3:
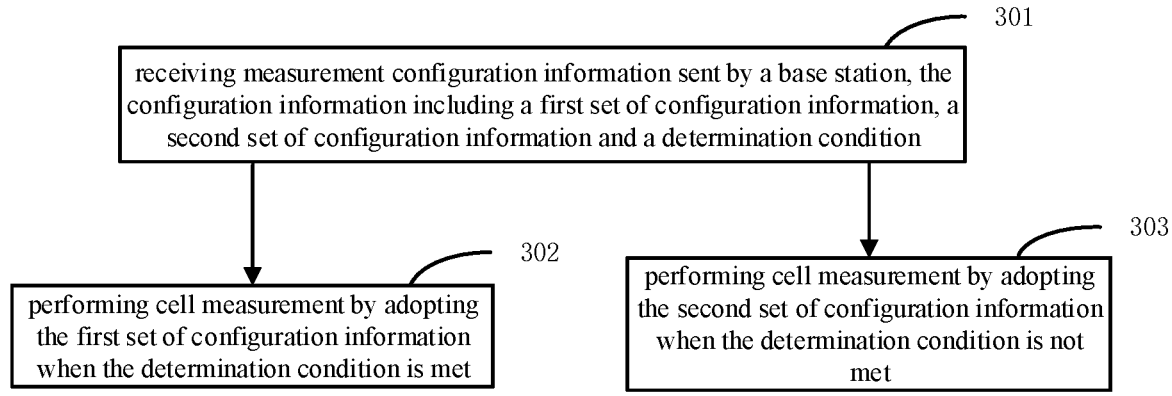
FIG. 3 is a flow chart illustrating a method for transmitting configuration information related to measurement control according to an embodiment.

FIG. 3 is a flow chart illustrating a method for transmitting configuration information related to measurement control according to an embodiment. This method is applied to a user device. The user device may be a mobile phone, a computer, a digital broadcast terminal, a messaging device, a game console, a tablet device, a medical device, a fitness device, a personal digital assistant, etc. As illustrated in FIG. 3, the method includes following steps 301-303.

At step 301, configuration information sent by a base station is received, the configuration information including a first set of configuration information, a second set of configuration information and one or more determination conditions. The first set of configuration information is related to a first measurement target, and the first measurement target is related to a known moving trajectory. The second set of configuration information is related to a second measurement target, and the second measurement target is related to an unknown moving trajectory.

At step 302, cell measurement is performed by adopting the first set of configuration information, when the one or more determination conditions are met.

At step 303, cell measurement is performed by adopting the second set of configuration information, when the one or more determination conditions are not met.

In this embodiment, only the base station serving the area with the known moving trajectory sends the first set of configuration information, the second set of configuration information and the determination conditions. When the user device can receive the first set of configuration information, the second set of configuration information, and determination conditions, it indicates that the user device is on a known moving trajectory. The user device on the known moving trajectory needs to determine whether it meets the determination condition received, and adopt the corresponding configuration information to carry out cell measurement according to the determining result. When the first set of configuration information is adopted for cell measurement, compared with the second set of configuration information for cell measurement, electricity can be saved.

In an embodiment, the first set of configuration information includes at least one of first measurement frequency points and a first measurement cycle;
the second set of configuration information includes at least one of second measurement frequency points and a second measurement cycle,
in which the first measurement cycle is greater than or equal to the second measurement cycle, the first measurement frequency points include frequency points in a neighboring cell covering the known moving trajectory, and a number of the first frequency points is less than a number of the second frequency points.

In this embodiment, the first set of configuration information is suitable for neighboring cells covering the known moving trajectory, that is, a part of neighboring cells in a particular direction. The second set of configuration information is suitable for most neighboring cells in all directions. Thus, the number of the first measurement frequency points is less than the number of the second measurement frequency points. Since the number of the first measurement frequency points is smaller, and the shape of the neighboring cell covering the known moving trajectory is usually elongated, the cell measurement may not be carried out frequently, and thus the first measurement cycle may be greater than the second measurement cycle. Both reducing the number of measurement frequency points and prolonging the measurement cycle can save the power of the user device.

In an embodiment, the one or more determination conditions include:
a number of times of cell reselection and receiving the first set of configuration information within a first preset period being greater than a first threshold number of times.

This embodiment provides a condition for determining the movement trajectory. Each time the user device performs cell reselection and receives the first set of configuration information in the reselected cell, the cumulative number of times is increased by 1. Since the base station sends the first set of configuration information to the user devices along the known moving trajectory, the user device receiving the first set of configuration information can determine that it is located along the known moving trajectory. The cell reselection of the user device may confirm that the user device is moving. Combined with the above two conditions, it can be determined that the user device is moving on the known moving trajectory. If the number of cell reselection and receiving the first group of configuration information within the first preset period is greater than the first threshold number of times, it can be determined that the user device is moving quickly on the known moving trajectory, which is applicable to the first group of configuration information. Other determination conditions for the moving trajectory also apply to this embodiment. The first period may be a hundred milliseconds or a few seconds. The first threshold number of times may be 3-5.

In an embodiment, the one or more determination conditions further include at least one of:
a detected moving speed being greater than a preset moving speed threshold; and
a number of times of cell change within a second preset period being greater than a number threshold number of times.

In this embodiment, the user device may determine its own moving speed according to the positioning function modules such as GPS (Global Positioning System) carried by itself, and then compare it with the moving speed threshold.

The number of cell changes carried out by the user device within a certain period of time may also reflect the moving speed of the user device. For each cell change (including cell reselection and cell handover), the cumulative number is increased by 1. If the updated number is greater than the second threshold number of times, the moving speed is determined to be fast and the determination condition is met.

This embodiment provides the determination conditions on the moving speed, making the first set of configuration information applicable to a user device that is moving rapidly on the known moving trajectory, for example, applicable to the user device in the car running on the highway, and the user device on the high-speed train, etc. Other determination conditions on the moving speed also apply to this embodiment. The second period may be a hundred milliseconds or a few seconds, etc. The second threshold number of times may be 3-5.

In an embodiment, the first set of configuration information further includes a first subset of configuration information related to an upward moving direction in the known moving trajectory; and/or a second subset of configuration information related to a downward moving direction in the known moving trajectory.

The method further includes steps A1-A2.

In step A1, its own moving direction is determined.

In step A2, it is determined whether its own moving direction belongs to a preset upward moving direction or a preset downward moving direction.

Step 302 includes step A3.

In step A3, cell measurement is performed according to the first subset of configuration information corresponding to the determined upward moving direction or second subset of configuration information corresponding to the determined downward moving direction.

In this embodiment, the user device may use the positioning function module carried by itself to determine its own moving direction, and then compare it with the pre-configured moving direction to determine whether the current direction is the upward moving direction or the downward moving direction. The system may send the configured moving direction to the user device in advance.

This embodiment may be applied to the scene where the moving trajectory is known, such as the highway and railway, and the system may send the map information with the moving direction to the user device in advance. The user device may use the corresponding subset of configuration information for cell measurement after determining whether the current direction is the upward or downward moving direction.

The implementation process is described in detail by embodiments below.

Figure 4:
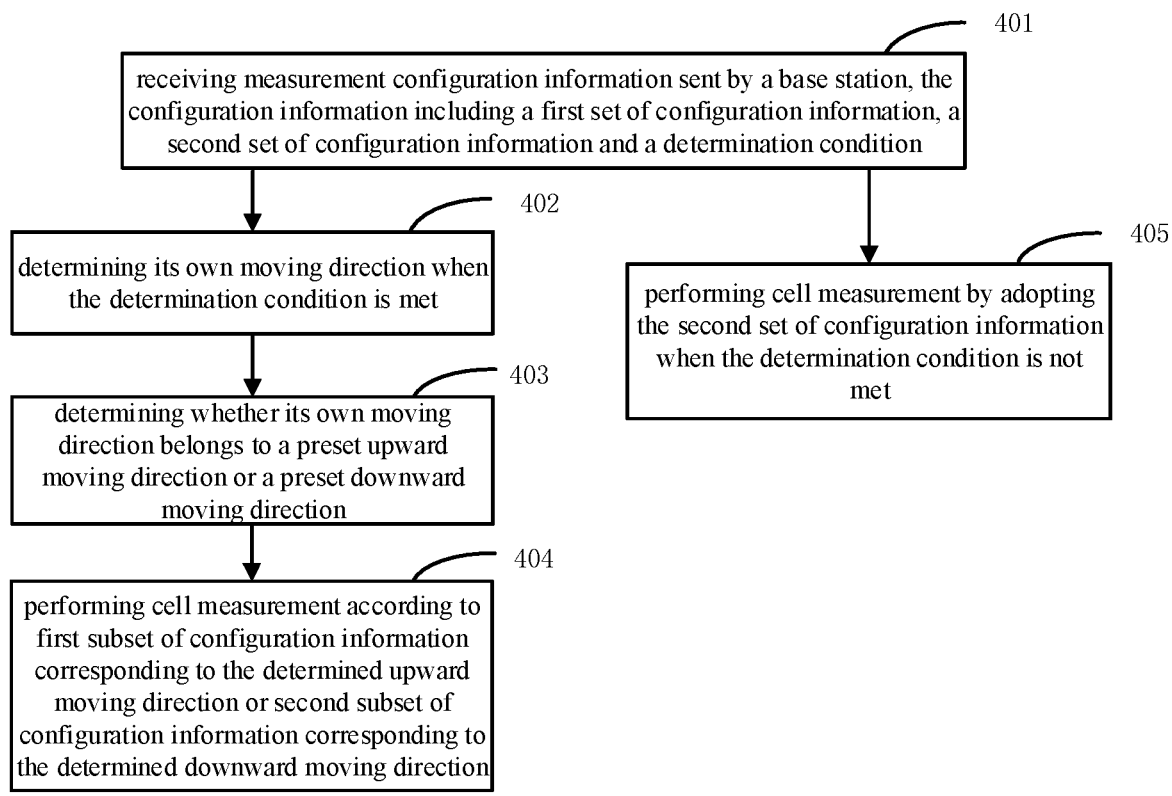
FIG. 4 is a flow chart illustrating a method for transmitting configuration information related to measurement control according to an embodiment.

FIG. 4 is a flow chart illustrating a method for transmitting configuration information related to measurement control according to an embodiment. This method is applied to a user device. The user device may be a mobile phone, a computer, a digital broadcasting terminal, a messaging device, a game console, a tablet device, a medical device, a fitness device, a personal digital assistant, etc. As shown in FIG. 4, the method includes the following steps 401-405.

At step 401, configuration information sent by a base station is received, the configuration information including a first set of configuration information, a second set of configuration information and one or more determination conditions. The first set of configuration information is related to a first measurement target, and the first measurement target is related to a known moving trajectory. The second set of configuration information is related to a second measurement target, and the second measurement target is related to an unknown moving trajectory.

At step 402, its own moving direction is determined when the one or more determination conditions are met.

At step 403, it is determined whether its own moving direction belongs to a preset upward moving direction or a preset downward moving direction.

At step 404, cell measurement is performed according to the first subset of configuration information corresponding to the determined upward moving direction or second subset of configuration information corresponding to the determined downward moving direction.

At step 405, cell measurement is performed by adopting the second set of configuration information when the one or more determination conditions are not met.

The implementation process is described in combination with both the base station side and the user device side.

Figure 5:
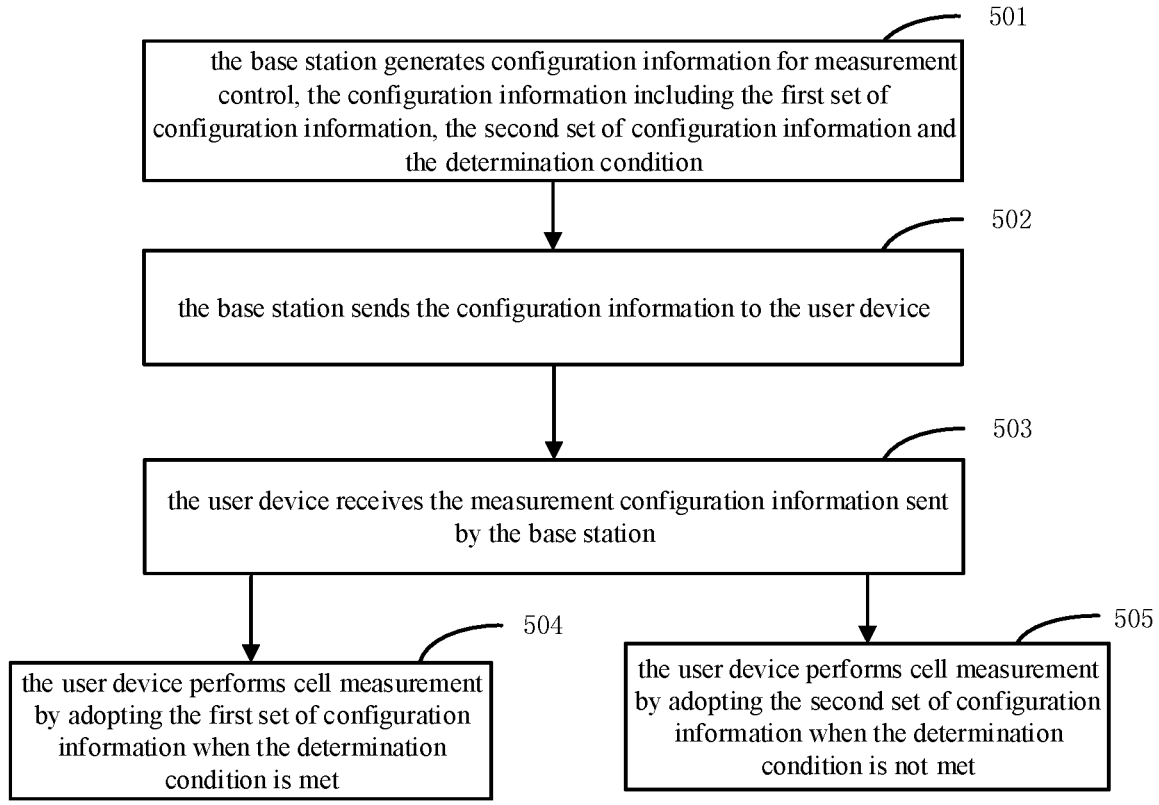
FIG. 5 is a flow chart illustrating a method for transmitting configuration information related to measurement control according to an embodiment.

FIG. 5 is a flow chart illustrating a method for transmitting configuration information related to measurement control according to an embodiment. As illustrated in FIG. 5, the method includes the following steps 501-502.

In Step 501, the base station generates configuration information for measurement control, the configuration information including the first set of configuration information, the second set of configuration information and the one or more determination conditions. The first set of configuration information is related to the first measurement target, and the first measurement target is related to the known moving trajectory. The second set of configuration information is related to the second measurement target, and the second measurement target is related to the unknown moving trajectory.

In Step 502, the base station sends the configuration information to the user device, to instruct the user device to adopt the first set of configuration information for cell measurement when the one or more determination conditions are met and adopt the second set of configuration information for cell measurement when the one or more determination conditions are not met.

In Step 503, the user device receives the measurement configuration information sent by the base station. The configuration information includes the first set of configuration information, the second set of configuration information and the one or more determination conditions. The first set of configuration information is related to the first measurement target, and the first measurement target is related to the known moving trajectory. The second set of configuration information is related to the second measurement target, and the second measurement target is related to the unknown moving trajectory.

In step 504, the user device performs cell measurement by adopting the first set of configuration information when the one or more determination conditions are met.

In step 505, the user device performs cell measurement by adopting the second set of configuration information when the one or more determination conditions are not met.

The above embodiments may be freely combined according to actual needs.

The following is device embodiments, which may be configured to execute the method embodiments.

Figure 6:
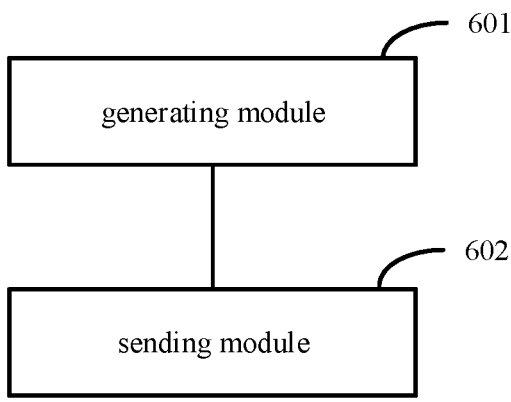
FIG. 6 is a block diagram illustrating a device for transmitting configuration information related to measurement control according to an embodiment.

FIG. 6 is a block diagram of a device for transmitting configuration information related to measurement control according to an embodiment. The device may be implemented as part or all of an electronic device by software, hardware, or a combination thereof. The device is applied to a base station side, and as illustrated in FIG. 6, the device includes a generating module 601 and a sending module 602.

The generating module 601 is configured to generate configuration information for measurement control. The configuration information includes a first set of configuration information, a second set of configuration information and one or more determination conditions. The first set of configuration information is related to a first measurement target, and the first measurement target is related to a known moving trajectory. The second set of configuration information is related to a second measurement target, and the second measurement target is related to an unknown moving trajectory.

The sending module 602 is configured to send the configuration information to a user device, to instruct the user device to adopt the first set of configuration information for cell measurement when the one or more determination conditions are met and to adopt the second set of configuration information for cell measurement when the one or more determination conditions are not met.

In an embodiment, the first set of configuration information includes at least one of first measurement frequency points and a first measurement cycle;
the second set of configuration information includes at least one of second measurement frequency points and a second measurement cycle,
in which the first measurement cycle is greater than or equal to the second measurement cycle, the first measurement frequency points include frequency points in a neighboring cell covering the known moving trajectory, and a number of the first frequency points is less than a number of the second frequency points.

In an embodiment, the one or more determination conditions include:
a number of times of cell reselection and receiving the first set of configuration information within a first preset period being greater than a first threshold number of times.

In an embodiment, the one or more determination conditions further include at least one of:
a detected moving speed being greater than a preset moving speed threshold;
a number of times of cell change within a second preset period being greater than a number threshold number of times.

In an embodiment, the first set of configuration information further includes: a first subset of configuration information related to an upward moving direction in the known moving trajectory; and/or a second subset of configuration information related to a downward moving direction in the known moving trajectory.

Figure 7:
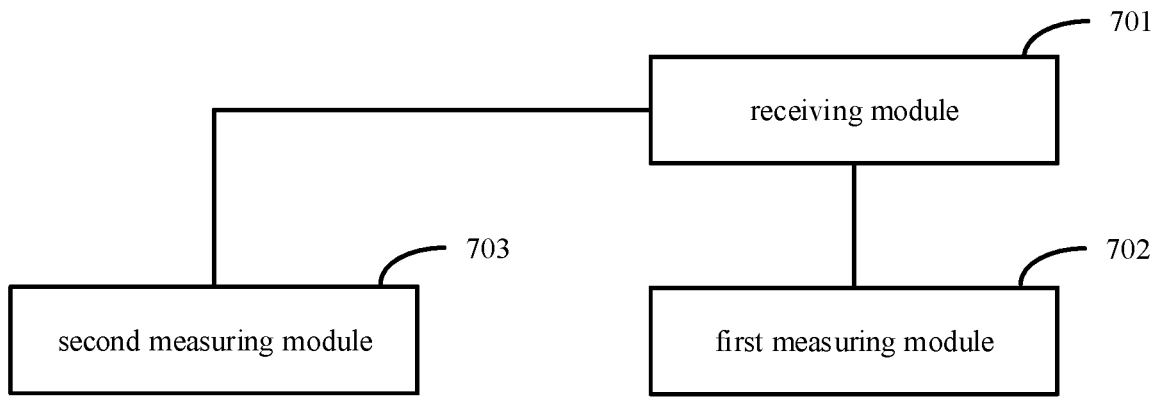
FIG. 7 is a block diagram illustrating a device for transmitting configuration information related to measurement control according to an embodiment.

FIG. 7 is a block diagram of a device for transmitting configuration information related to measurement control according to an embodiment. The device may be implemented as part or all of an electronic device by software, hardware, or a combination thereof. The device is applied to a user device side, and as illustrated in FIG. 7, the device includes a receiving module 701, a first measuring module 702 and a second measuring module 703.

The receiving module 701 is configured to receive measurement configuration information sent by a base station. The configuration information includes a first set of configuration information, a second set of configuration information and one or more determination conditions. The first set of configuration information is related to a first measurement target, and the first measurement target is related to a known moving trajectory. The second set of configuration information is related to a second measurement target, and the second measurement target is related to an unknown moving trajectory.

The first measuring module 702 is configured to perform cell measurement by adopting the first set of configuration information when the one or more determination conditions are met.

The second measuring module 703 is configured to perform cell measurement by adopting the second set of configuration information when the one or more determination conditions are not met.

In an embodiment, the first set of configuration information includes at least one of first measurement frequency points and a first measurement cycle;
the second set of configuration information includes at least one of second measurement frequency points and a second measurement cycle,
wherein the first measurement cycle is greater than or equal to the second measurement cycle, the first measurement frequency points include frequency points in a neighboring cell covering the known moving trajectory, and a number of the first frequency points is less than a number of the second frequency points.

In an embodiment, the one or more determination conditions include:
a number of times of cell reselection and receiving the first set of configuration information within a first preset period being greater than a first threshold number of times.

In an embodiment, the one or more determination conditions further include at least one of:
a detected moving speed being greater than a preset moving speed threshold;
a number of times of cell change within a second preset period being greater than a number threshold number of times.

In an embodiment, the first set of configuration information further includes: a first subset of configuration information related to an upward moving direction in the known moving trajectory; and/or a second subset of configuration information related to a downward moving direction in the known moving trajectory.

Figure 8:
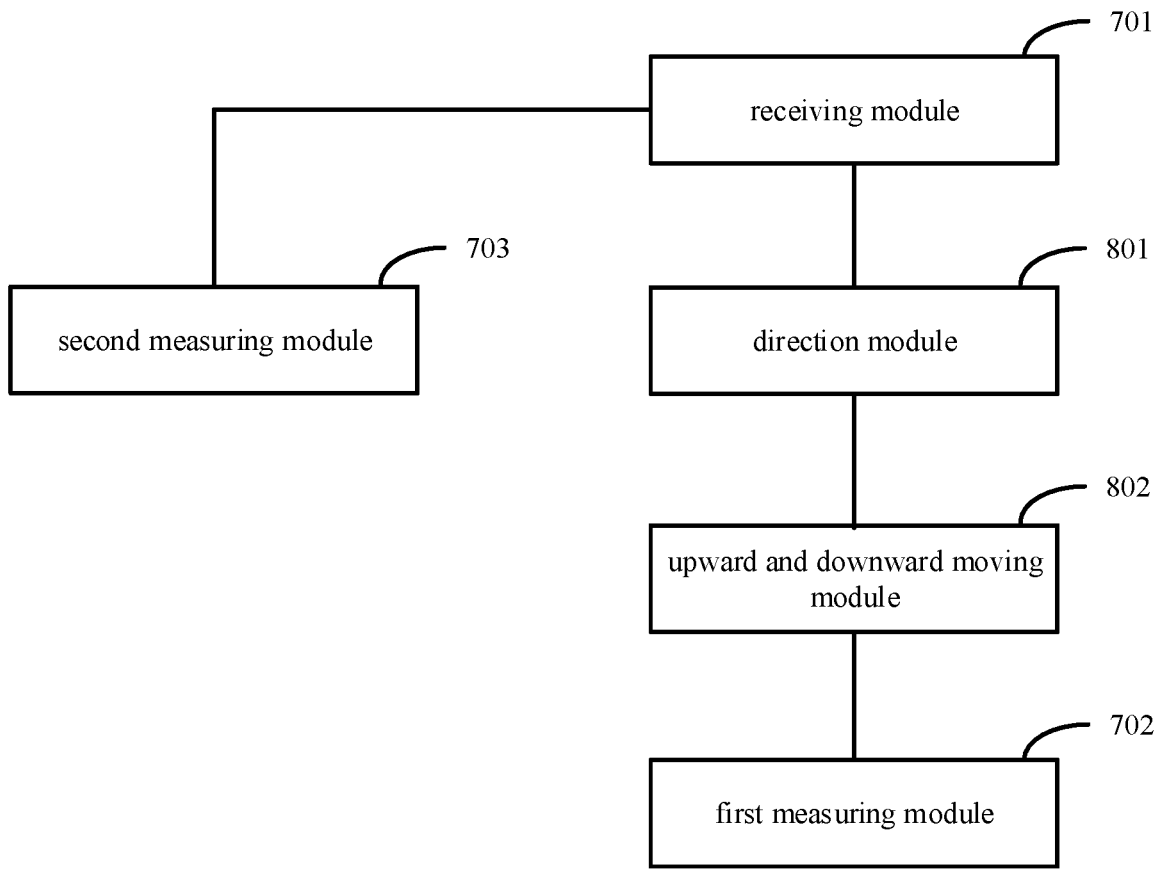
FIG. 8 is a block diagram illustrating a device for transmitting configuration information related to measurement control according to an embodiment.

As illustrated in FIG. 8, the device further includes a direction module 801 and an upward and downward moving module 802.

The direction module 801 is configured to determine its own moving direction.

The upward and downward moving module 802 is configured to determine whether its own moving direction belongs to a preset upward moving direction or a preset downward moving direction.

Figure 9:
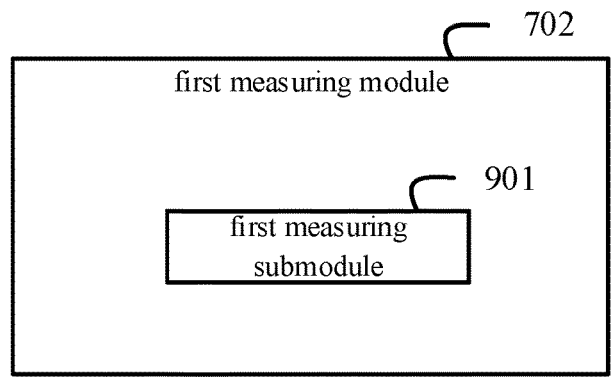
FIG. 9 is a block diagram illustrating a first measuring module according to an embodiment.

As illustrated in FIG. 9, the first measuring module 702 includes a first measuring submodule 901.

The first measuring submodule 901 is configured to perform cell measurement according to first subset of configuration information corresponding to the determined upward moving direction or second subset of configuration information corresponding to the determined downward moving direction.

With respect to the devices in above embodiments, the specific manner in which each module performs the operation has been described in detail in the method embodiments and will not be elaborated here.

Figure 10:
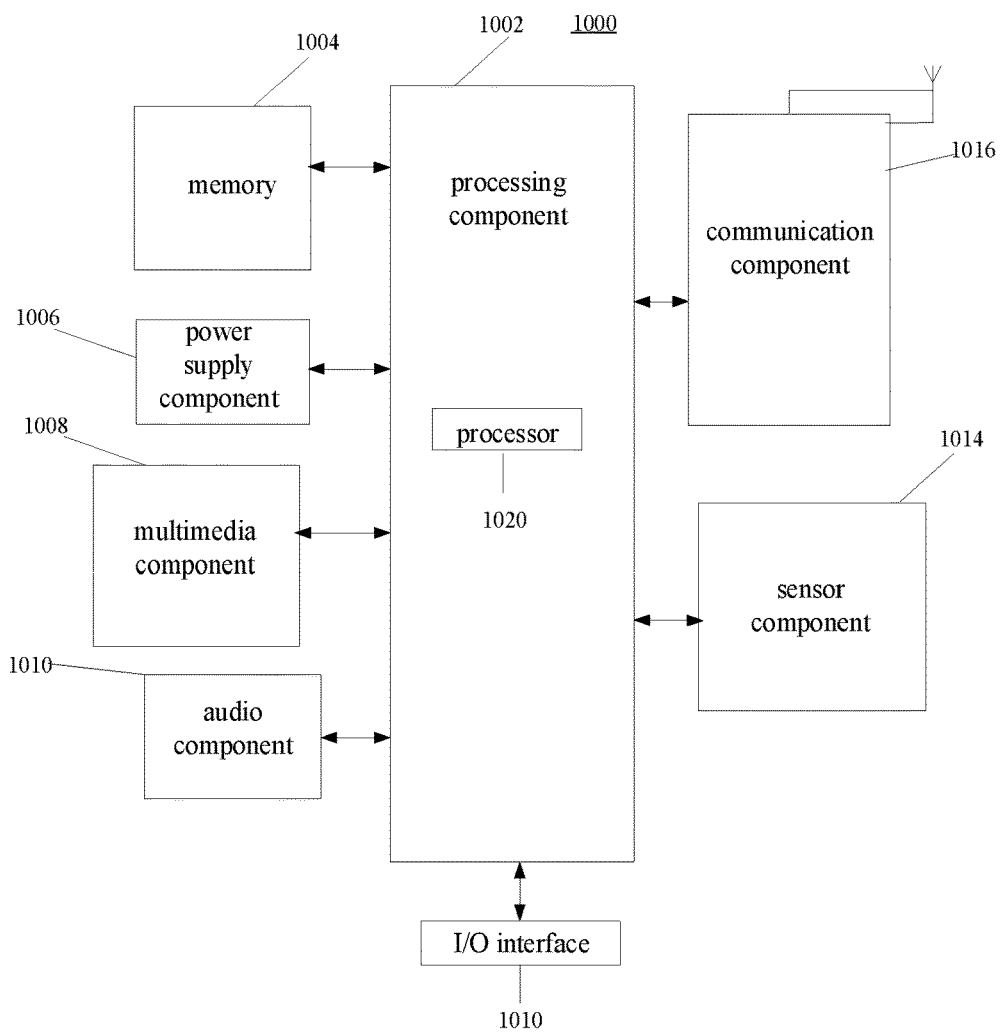
FIG. 10 is a schematic diagram illustrating a device suitable for transmitting configuration information related to measurement control according to an embodiment.

FIG. 10 is a schematic diagram of a device suitable for transmitting configuration information related to measurement control according to an embodiment. For example, the device 1000 may be a mobile phone, a computer, a digital broadcast terminal, a messaging device, a game console, a tablet device, a medical device, a fitness device, a personal digital assistant, etc.

The device 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 generally controls the overall operations of the device 1000, such as operations associated with display, telephone calls, data communications, camera operations, and recording operations. The processing component 1002 may include one or more processors 1020 to execute instructions to implement all or part of the steps of the foregoing method. In addition, the processing component 1002 may include one or more modules to facilitate the interaction between the processing component 1002 and other components. For example, the processing component 1002 may include a multimedia module to facilitate the interaction between the multimedia component 908 and the processing component 1002.

The memory 1004 is configured to store various types of data to support the operation of the device 1000. Examples of such data include instructions for any application or method operating on the device 1000, contact data, phone book data, messages, pictures, videos, etc. The memory 1004 can be implemented by any type of volatile or non-volatile storage device or a combination thereof, such as static random access memory (SRAM), electrically erasable programmable read-only memory (EEPROM), erasable and Programmable read-only memory (EPROM), programmable read-only memory (PROM), read-only memory (ROM), magnetic memory, flash memory, magnetic disk or optical disk.

The power supply component 1006 provides power for various components of the device 1000. The power supply component 1006 may include a power management system, one or more power supplies, and other components for generating, managing, and distributing power for the device 1000.

The multimedia component 1008 includes a screen that provides an output interface between the device 1000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense a touch, a slide, and gestures on the touch panel. The touch sensor may not only sense the boundary of the touch or slide operation, but also detect the duration and pressure related to the touch or slide operation. In some embodiments, the multimedia component 1008 includes a front camera and/or a rear camera. When the device 1000 is in an operation mode, such as a shooting mode or a video mode, the front camera and/or the rear camera can receive external multimedia data. Each front camera and rear camera can be a fixed optical lens system or have focal length and optical zoom capabilities.

The audio component 1010 is configured to output and/or input audio signals. For example, the audio component 1010 includes a microphone (MIC). When the device 1000 is in an operation mode, such as a call mode, a recording mode, and a voice recognition mode, the microphone is configured to receive external audio signals. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and a peripheral interface module. The above-mentioned peripheral interface module may be a keyboard, a click wheel, a button, and the like. These buttons may include, but are not limited to: a home button, a volume button, a start button, and a lock button.

The sensor component 1014 includes one or more sensors for providing the device 1000 with various aspects of state assessment. For example, the sensor component 1014 can detect the ON/OFF state of the device 1000 and the relative positioning of components, such as the display and keypad of the device 1000. The sensor component 1014 can also detect the position change of the device 1000 or a component of the device 1000, presence or absence of contact between the user and the device 1000, the orientation or acceleration/deceleration of the device 1000, and the temperature change of the device 1000. The sensor component 1014 may include a proximity sensor configured to detect the presence of an object nearby when there is no physical contact. The sensor component 1014 may also include an optical sensor, such as a CMOS or CCD image sensor, for use in imaging applications. In some embodiments, the sensor component 1014 may also include an acceleration sensor, a gyroscope sensor, a magnetic sensor, a pressure sensor, or a temperature sensor.

The communication component 1016 is configured to facilitate wired or wireless communication between the device 1000 and other devices. The device 1000 can access a wireless network based on a communication standard, such as WiFi, 2G, or 3G, or a combination thereof. In an embodiment, the communication component 1016 receives a broadcast signal or a broadcast related message from an external broadcast management system via a broadcast channel. In an embodiment, the communication component 1016 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the device 1000 may be implemented by one or more application specific integrated circuits (ASIC), digital signal processors (DSP), digital signal processing devices (DSPD), programmable logic devices (PLD), field programmable gate array (FPGA), controller, microcontroller, microprocessor, or other electronic component, and is configured to implement the above-mentioned method for processing the SI request.

In an embodiment, there is also provided a non-transitory computer-readable storage medium including instructions, for example, the memory 1004 including instructions, and the foregoing instructions may be executed by the processor 1020 of the device 1000 to implement the foregoing method. For example, the non-transitory computer-readable storage medium may be ROM, random access memory (RAM), CD-ROM, magnetic tape, floppy disk, optical data storage device, etc.

In an embodiment, there is provided a device for transmitting configuration information related to measurement control, including:
    a processor; and
    a memory, configured to store instructions executable by the processor,
    wherein the processor is configured to:
    receive measurement configuration information sent by a base station, the configuration information including a first set of configuration information, a second set of configuration information and one or more determination conditions, the first set of configuration information being related to a first measurement target, the first measurement target being related to a known moving trajectory, the second set of configuration information being related to a second measurement target, the second measurement target being related to an unknown moving trajectory;

perform cell measurement by adopting the first set of configuration information when the one or more determination conditions are met; and perform cell measurement by adopting the second set of configuration information when the one or more determination conditions are not met.

The processor may be further configured such that:

the first set of configuration information includes at least one of first measurement frequency points and a first measurement cycle;

the second set of configuration information includes at least one of second measurement frequency points and a second measurement cycle, wherein the first measurement cycle is greater than or equal to the second measurement cycle, the first measurement frequency points include frequency points in a neighboring cell covering the known moving trajectory, and a number of the first frequency points is less than a number of the second frequency points.

The processor may be further configured such that:

the one or more determination conditions include a number of times of cell reselection and receiving the first set of configuration information within a first preset period being greater than a first threshold number of times.

The processor may be further configured such that:

the one or more determination conditions further include at least one of:

a detected moving speed being greater than a preset moving speed threshold;

a number of times of cell change within a second preset period being greater than a number threshold number of times.

The processor may be further configured such that:

the first set of configuration information further includes:

a first subset of configuration information related to an upward moving direction in the known moving trajectory; and/or a second subset of configuration information related to a downward moving direction in the known moving trajectory;

the method further includes:

determining its own moving direction; and determining whether its own moving direction belongs to a preset upward moving direction or a preset downward moving direction;

performing cell measurement by adopting the first set of configuration information includes:

performing cell measurement according to first subset of configuration information corresponding to the determined upward moving direction or second subset of configuration information corresponding to the determined downward moving direction.

A computer readable storage medium is provided. When instructions in the storage medium are executed by a processor of a device, the device is enabled to implement the above method for transmitting configuration information related to measurement control. The method includes:

receiving measurement configuration information sent by a base station, the configuration information including a first set of configuration information, a second set of configuration information and one or more determination conditions, the first set of configuration information being related to a first measurement target, the first measurement target being related to a known moving trajectory, the second set of configuration information being related to a second measurement target, the second measurement target being related to an unknown moving trajectory;

performing cell measurement by adopting the first set of configuration information when the one or more determination conditions are met; and performing cell measurement by adopting the second set of configuration information when the one or more determination conditions are not met.

The instructions in the storage medium may further include:

the first set of configuration information includes at least one of first measurement frequency points and a first measurement cycle;

the second set of configuration information includes at least one of second measurement frequency points and a second measurement cycle, wherein the first measurement cycle is greater than or equal to the second measurement cycle, the first measurement frequency points include frequency points in a neighboring cell covering the known moving trajectory, and a number of the first frequency points is less than a number of the second frequency points.

The instructions in the storage medium may further include:

the one or more determination conditions include:

a number of times of cell reselection and receiving the first set of configuration information within a first preset period being greater than a first threshold number of times.

The instructions in the storage medium may further include:

the one or more determination conditions further include at least one of:

a detected moving speed being greater than a preset moving speed threshold;

a number of times of cell change within a second preset period being greater than a number threshold number of times.

The instructions in the storage medium may further include:

the first set of configuration information further includes:

a first subset of configuration information related to an upward moving direction in the known moving trajectory; and/or a second subset of configuration information related to a downward moving direction in the known moving trajectory;

the method further includes:

determining its own moving direction; and determining whether its own moving direction belongs to a preset upward moving direction or a preset downward moving direction;

performing cell measurement by adopting the first set of configuration information includes:

performing cell measurement according to first subset of configuration information corresponding to the determined upward moving direction or second subset of configuration information corresponding to the determined downward moving direction.

Figure 11:
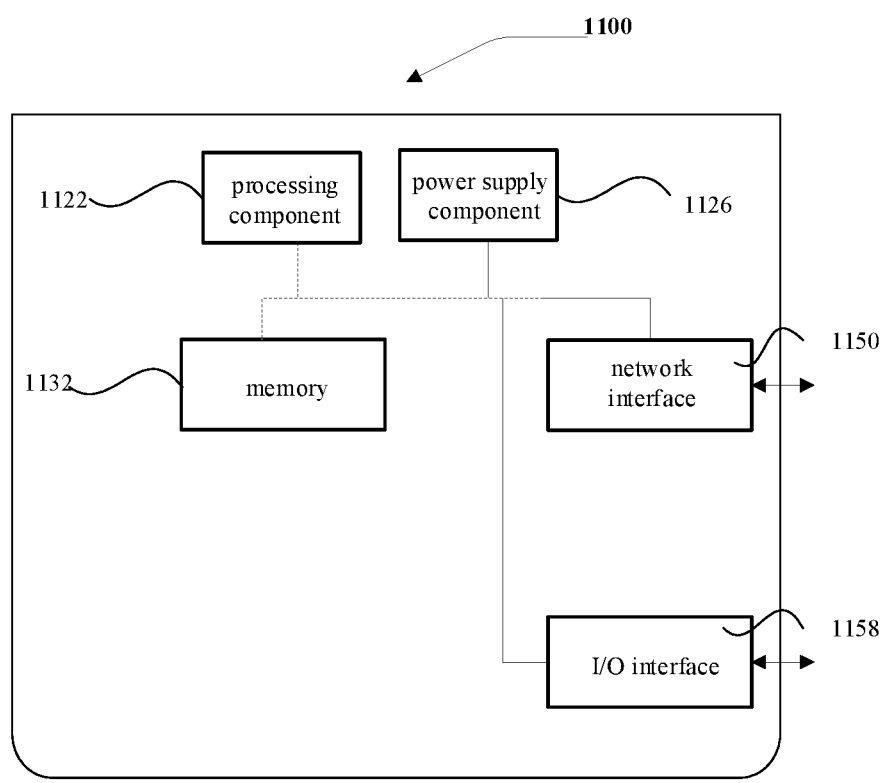
FIG. 11 is a schematic diagram illustrating a device suitable for transmitting configuration information related to measurement control according to an embodiment.

FIG. 11 is a schematic diagram of a device for data synchronization according to an embodiment. For example, the device 1100 may be provided as a computer. Referring to FIG. 11, the device 1100 includes a processing component 1122, which further includes one or more processor, and memory resource represented by a memory 1132 for storing instructions that can be executed by the processing component 1122, such as application programs. The application programs stored in the memory 1132 may contain one or more modules each corresponding to a set of instructions. In addition, the processing component 1122 is configured to execute instructions to perform the above methods.

The device 1100 may further include a power supply component 1126 configured to perform power management of the device 1100, a wired or wireless network interface 1150 configured to connect the device 1100 to the network, and an input/output (I/O) interface 1158. The device 1100 can operate based on an operating system stored in the memory 1132, such as Windows Server™, Mac OS X™, Unix™, Linux™, FreeBSD™ or the like.

In an embodiment, there is provided a device for transmitting configuration information related to measurement control, including:
a processor; and
a memory, configured to store instructions executable by the processor,
wherein the processor is configured to:
generate configuration information for measurement control, the configuration information including a first set of configuration information, a second set of configuration information and one or more determination conditions, the first set of configuration information being related to a first measurement target, the first measurement target being related to a known moving trajectory, the second set of configuration information being related to a second measurement target, the second measurement target being related to an unknown moving trajectory; and
send the configuration information to a user device, to instruct the user device to adopt the first set of configuration information for cell measurement when the one or more determination conditions are met and to adopt the second set of configuration information for cell measurement when the one or more determination conditions are not met.

The processor may be further configured such that:
the first set of configuration information includes at least one of first measurement frequency points and a first measurement cycle;
the second set of configuration information includes at least one of second measurement frequency points and a second measurement cycle,
wherein the first measurement cycle is greater than or equal to the second measurement cycle, the first measurement frequency points include frequency points in a neighboring cell covering the known moving trajectory, and a number of the first frequency points is less than a number of the second frequency points.

The processor may be further configured such that:
the one or more determination conditions include:
a number of times of cell reselection and receiving the first set of configuration information within a first preset period being greater than a first threshold number of times.

The processor may be further configured such that:
the one or more determination conditions further include at least one of:
a detected moving speed being greater than a preset moving speed threshold;
a number of times of cell change within a second preset period being greater than a number threshold number of times.

The processor may be further configured such that:
the first set of configuration information further includes:
a first subset of configuration information related to an upward moving direction in the known moving trajectory; and/or a second subset of configuration information related to a downward moving direction in the known moving trajectory.

A computer readable storage medium is provided. When instructions in the storage medium are executed by a processor of a device, the device is enabled to implement the method for transmitting configuration information related to measurement control. The method includes:
generating configuration information for measurement control, the configuration information including a first set of configuration information, a second set of configuration information and one or more determination conditions, the first set of configuration information being related to a first measurement target, the first measurement target being related to a known moving trajectory, the second set of configuration information being related to a second measurement target, the second measurement target being related to an unknown moving trajectory; and
sending the configuration information to a user device, to instruct the user device to adopt the first set of configuration information for cell measurement when the one or more determination conditions are met and to adopt the second set of configuration information for cell measurement when the one or more determination conditions are not met.

The instructions in the storage medium may further include:
the first set of configuration information includes at least one of first measurement frequency points and a first measurement cycle;
the second set of configuration information includes at least one of second measurement frequency points and a second measurement cycle,
wherein the first measurement cycle is greater than or equal to the second measurement cycle, the first measurement frequency points include frequency points in a neighboring cell covering the known moving trajectory, and a number of the first frequency points is less than a number of the second frequency points.

The instructions in the storage medium may further include:
the one or more determination conditions include:
a number of times of cell reselection and receiving the first set of configuration information within a first preset period being greater than a first threshold number of times.

The instructions in the storage medium may further include:
the one or more determination conditions further include at least one of:
a detected moving speed being greater than a preset moving speed threshold;
a number of times of cell change within a second preset period being greater than a number threshold number of times.

The instructions in the storage medium may further include:
the first set of configuration information further includes:
a first subset of configuration information related to an upward moving direction in the known moving trajectory; and/or a second subset of configuration information related to a downward moving direction in the known moving trajectory.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other embodiments of the present disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only.

It will be appreciated that the present invention is not limited to the exact construction that has been described above and illustrated in the accompanying drawings and that various modifications and changes can be made without departing from the scope thereof

What is claimed is:

1. A method for transmitting configuration information related to measurement control, applied to a base station, comprising:
   generating configuration information for measurement control, the configuration information comprising a first set of configuration information, a second set of configuration information and one or more determination conditions, the first set of configuration information being related to a first measurement target, the first measurement target being related to a known moving trajectory, the second set of configuration information being related to a second measurement target, the second measurement target being related to an unknown moving trajectory; and
   sending the configuration information to a user device, to instruct the user device to adopt the first set of configuration information for cell measurement when the one or more determination conditions are met and to adopt the second set of configuration information for cell measurement when the one or more determination conditions are not met;
   wherein the first set of configuration information comprises at least one of first measurement frequency points and a first measurement cycle; and the second set of configuration information comprises at least one of second measurement frequency points and a second measurement cycle;
   wherein the first measurement cycle is greater than or equal to the second measurement cycle, the first measurement frequency points comprise frequency points in a neighboring cell covering the known moving trajectory, and a number of the first frequency points is less than a number of the second frequency points.

2. The method of claim 1, wherein the one or more determination conditions comprise:
   a number of times of cell reselection and receiving the first set of configuration information within a first preset period being greater than a first threshold number of times.

3. The method of claim 2, wherein the one or more determination conditions further comprise at least one of:
   a detected moving speed being greater than a preset moving speed threshold; or
   a number of times of cell change within a second preset period being greater than a number threshold number of times.

4. The method of claim 1, wherein the first set of configuration information further comprises at least one of:
   a first subset of configuration information related to an upward moving direction in the known moving trajectory; or
   a second subset of configuration information related to a downward moving direction in the known moving trajectory.

5. A method for transmitting configuration information related to measurement control, applied to a user device, comprising:
   receiving measurement configuration information sent by a base station, the configuration information comprising a first set of configuration information, a second set of configuration information and one or more determination conditions, the first set of configuration information being related to a first measurement target, the first measurement target being related to a known moving trajectory, the second set of configuration information being related to a second measurement target, the second measurement target being related to an unknown moving trajectory;
   performing cell measurement by adopting the first set of configuration information when the one or more determination conditions are met; and
   performing cell measurement by adopting the second set of configuration information when the one or more determination conditions are not met;
   wherein the first set of configuration information comprises at least one of first measurement frequency points and a first measurement cycle; and the second set of configuration information comprises at least one of second measurement frequency points and a second measurement cycle;
   wherein the first measurement cycle is greater than or equal to the second measurement cycle, the first measurement frequency points comprise frequency points in a neighboring cell covering the known moving trajectory, and a number of the first frequency points is less than a number of the second frequency points.

6. The method of claim 5, wherein the one or more determination conditions comprise:
   a number of times of cell reselection and receiving the first set of configuration information within a first preset period being greater than a first threshold number of times.

7. The method of claim 6, wherein the one or more determination conditions further comprise at least one of:
   a detected moving speed being greater than a preset moving speed threshold; or a number of times of cell change within a second preset period being greater than a number threshold number of times.

8. The method of claim 5, wherein the first set of configuration information further comprises at least one of:
a first subset of configuration information related to an upward moving direction in the known moving trajectory; or
a second subset of configuration information related to a downward moving direction in the known moving trajectory;
wherein the method further comprises:
determining a moving direction of the user device; and
determining whether the moving direction of the user device belongs to a preset upward moving direction or a preset downward moving direction; and
wherein performing cell measurement by adopting the first set of configuration information comprises:
performing cell measurement according to first subset of configuration information corresponding to the determined upward moving direction or second subset of configuration information corresponding to the determined downward moving direction.

9. A device for transmitting configuration information related to measurement control, comprising:
a processor; and
a memory, configured to store instructions executable by the processor, wherein the processor is configured to:
generate configuration information for measurement control, the configuration information comprising a first set of configuration information, a second set of configuration information and one or more determination conditions, the first set of configuration information being related to a first measurement target, the first measurement target being related to a known moving trajectory, the second set of configuration information being related to a second measurement target, the second measurement target being related to an unknown moving trajectory; and
send the configuration information to a user device, to instruct the user device to perform a cell measurement by adopting the first set of configuration information for cell measurement when the one or more determination conditions are met and to perform the cell measurement by adopting the second set of configuration information for cell measurement when the one or more determination conditions are not met;
wherein the first set of configuration information comprises at least one of first measurement frequency points and a first measurement cycle; and the second set of configuration information comprises at least one of second measurement frequency points and a second measurement cycle; and
wherein the first measurement cycle is greater than or equal to the second measurement cycle, the first measurement frequency points comprise frequency points in a neighboring cell covering the known moving trajectory, and a number of the first frequency points is less than a number of the second frequency points.

10. The device of claim 9, wherein the one or more determination conditions comprise:
a number of times of cell reselection and receiving the first set of configuration information within a first preset period being greater than a first threshold number of times.

11. The device of claim 10, wherein the one or more determination conditions further comprise at least one of:
a detected moving speed being greater than a preset moving speed threshold; or
a number of times of cell change within a second preset period being greater than a number threshold number of times.

12. The device of claim 9, wherein the first set of configuration information further comprises at least one of:
a first subset of configuration information related to an upward moving direction in the known moving trajectory; or
a second subset of configuration information related to a downward moving direction in the known moving trajectory.

13. A device for transmitting configuration information related to measurement control, comprising:
a processor; and
a memory, configured to store instructions executable by the processor, wherein the processor is configured to perform steps of the method of claim 5.

* * * * *